(12) United States Patent
Xiao et al.

(10) Patent No.: US 11,586,255 B2
(45) Date of Patent: Feb. 21, 2023

(54) METHOD AND APPARATUS FOR ADJUSTING VIEW FOR TARGET DEVICE, ELECTRONIC DEVICE AND MEDIUM

(71) Applicant: BEIJING BYTEDANCE NETWORK TECHNOLOGY CO., LTD., Beijing (CN)

(72) Inventors: Junpeng Xiao, Beijing (CN); Huijun Yu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/742,328

(22) Filed: May 11, 2022

(65) Prior Publication Data

US 2022/0269318 A1 Aug. 25, 2022

Related U.S. Application Data (63) Continuation of application No. PCT/CN2020/127248, filed on Nov. 6, 2020.

(30) Foreign Application Priority Data

Nov. 19, 2019 (CN) .......................... 201911131816.7

(51) Int. Cl.
  *G06F 1/16* (2006.01)
  *H04N 21/431* (2011.01)
  *H04N 21/488* (2011.01)

(52) U.S. Cl.
  CPC .......... *G06F 1/1694* (2013.01); *G06F 1/1626* (2013.01); *H04N 21/4312* (2013.01);
  (Continued)

(58) Field of Classification Search
  CPC . G06F 1/1626; G06F 1/1694; H04N 21/4312; H04N 21/4882
  (Continued)

(56) References Cited

U.S. PATENT DOCUMENTS

| 6,788,293 B1* | 9/2004 | Silverbrook ........... G06Q 40/00 345/169 |
| 2004/0157647 A1* | 8/2004 | Takahashi .......... H04N 21/4122 455/566 |

(Continued)

FOREIGN PATENT DOCUMENTS

| CN | 1534589 A | 10/2004 |
| CN | 102655548 A | 9/2012 |

(Continued)

OTHER PUBLICATIONS

International Patent Application No. PCT/CN2020/127248; Int'l Written Opinion and Search Report; dated Jan. 27, 2021; 8 pages.

(Continued)

*Primary Examiner* — William D Titcomb
(74) *Attorney, Agent, or Firm* — BakerHostetler (57) ABSTRACT

A method and an apparatus for adjusting a view for a target device, an electronic device, and a computer-readable medium are provided by the embodiments of the present disclosure. A specific implementation of the method includes: determining whether a currently playing video is a video of a first type in response to detecting a change of a posture of the target device; and adjusting a display direction of the video-stream-play view to match the posture of the target device and adjusting a display position and/or transparency of the at least one video-stream-play interactive control in response to determining that the currently playing video is the video of the first type. This implementation achieves matching of the view with the posture of the target (Continued)

device and enhances adaptability of the video-stream-play interactive control with the adjusted video-stream-play view.

9 Claims, 4 Drawing Sheets

(52) U.S. Cl.
CPC . *H04N 21/4882* (2013.01); *G06F 2200/1614* (2013.01); *G06F 2200/1637* (2013.01)

(58) Field of Classification Search
USPC ........................................................ 345/156
See application file for complete search history.

(56) References Cited

U.S. PATENT DOCUMENTS

| | | | |
|---|---|---|---|
| 2009/0304359 A1 | 12/2009 | Lemay et al. | |
| 2011/0249073 A1 | 10/2011 | Cranfill et al. | |
| 2014/0082545 A1* | 3/2014 | Zhai | G06F 3/04886 715/773 |
| 2014/0157210 A1* | 6/2014 | Katz | G06F 1/1694 715/863 |
| 2014/0168477 A1* | 6/2014 | David | H04N 7/015 348/441 |
| 2015/0095775 A1 | 4/2015 | Lewis et al. | |
| 2016/0335557 A1* | 11/2016 | Kurata | G06N 7/005 |
| 2017/0052566 A1* | 2/2017 | Ka | H04R 3/12 |
| 2017/0168652 A1* | 6/2017 | Lipman | G06F 1/1643 |
| 2019/0205004 A1 | 7/2019 | Lee et al. | |
| 2019/0250699 A1* | 8/2019 | Mulase | G06F 3/04842 |
| 2020/0286245 A1* | 9/2020 | Dong | G06T 7/277 |
| 2021/0072802 A1* | 3/2021 | Wang | G09G 5/10 |

FOREIGN PATENT DOCUMENTS

| | | |
|---|---|---|
| CN | 103105999 A | 5/2013 |
| CN | 104978115 A | 10/2015 |
| CN | 105117105 A | 12/2015 |
| CN | 105426045 A | 3/2016 |
| CN | 106371719 A | 2/2017 |
| CN | 106899878 A | 6/2017 |
| CN | 107613342 A | 1/2018 |
| CN | 108124167 A | 6/2018 |
| CN | 108574806 A | 9/2018 |
| CN | 109445572 A | 3/2019 |
| CN | 109634479 A | 4/2019 |
| CN | 105988578 B | 6/2019 |
| CN | 110399064 A | 11/2019 |
| CN | 110896495 A | 3/2020 |
| JP | 2001-142445 A | 5/2001 |
| JP | 2016-174388 A | 9/2016 |
| WO | WO 2009/038596 A1 | 3/2009 |

OTHER PUBLICATIONS

European Patent Application No. 20891169.3; Extended Search Report; dated Nov. 17, 2022; 9 pages.

* cited by examiner

METHOD AND APPARATUS FOR ADJUSTING VIEW FOR TARGET DEVICE, ELECTRONIC DEVICE AND MEDIUM

The present application is a continuation of International Patent Application No. PCT/CN2020/127248, filed on Nov. 6, 2020, which claims priority of Chinese Patent Application No. 201911131816.7, filed on Nov. 19, 2019, and the entire content disclosed by the Chinese patent application is incorporated herein by reference as part of the present application.

TECHNICAL FIELD

Embodiments of the present disclosure relate to the technical field of computers, and in particular, to a method and an apparatus for adjusting a view for a target device, an electronic device, and a computer-readable medium.

BACKGROUND

Continuously developing electronic devices and various applications have caused enormous changes in people's daily life and especially have enriched people's recreational life. People can enjoy leisure activities such as watching videos and listening to music of interest by means of electronic devices and various applications installed thereon. In a scenario where a user watches a video stream by means of an electronic device and an application installed thereon, when the video is displayed horizontally, other elements such as some interactive controls may often be present on the screen.

SUMMARY

The inventive concepts of the present disclosure are briefly introduced here and will be described in detail in the following detailed description. The summary is neither intended to indicate the key features or essential features of the claimed technical solutions nor meant to limit the scope of the claimed technical solutions.

Some embodiments of the present disclosure provide a method and an apparatus for adjusting a view for a target device, an electronic device, and a computer-readable medium.

In a first aspect, some embodiments of the present disclosure provide a method for adjusting a view for a target device, the target device displays a video-stream-play page, the video-stream-play page comprises a video-stream-play view and at least one video-stream-play interactive control displayed on the video-stream-play view, and the method comprises: determining whether a currently playing video is a video of a first type in response to detecting a change of a posture of the target device; and adjusting a display direction of the video-stream-play view to match the posture of the target device and adjusting a display position and/or transparency of the at least one video-stream-play interactive control in response to determining that the currently playing video is the video of the first type.

In a second aspect, some embodiments of the present disclosure provide an apparatus for adjusting a view for a target device, the target device displays a video-stream-play page, the video-stream-play page comprises a video-stream-play view and at least one video-stream-play interactive control displayed on the video-stream-play view, and the apparatus comprises: a determining unit, configured to determine whether a currently playing video is a video of a first type in response to detecting a change of a posture of the target device; and an adjusting unit, configured to adjust a display direction of the video-stream-play view to match the posture of the target device and adjust a display position and/or transparency of the at least one video-stream-play interactive control in response to determining that the currently playing video is the video of the first type.

In a third aspect, some embodiments of the present disclosure provide an electronic device, comprising: one or more processors, and a memory, on which one or more programs are stored; and the one or more programs, when executed by the one or more processors, cause the one or more processors to implement the method as described in any implementation of the first aspect.

In a fourth aspect, some embodiments of the present disclosure provide a computer-readable medium, on which a computer program is stored, wherein the program, when executed by a processor, implements the method as described in any implementation of the first aspect.

The method and apparatus for adjusting a view for a target device, the electronic device, and the computer-readable medium provided by some embodiments of the present disclosure, by detecting an posture change of the target device and determining a type of a currently playing video, can adjust a display direction of a video-stream-play view to match the posture of the target device, and can also adjust a display position and/or transparency of at least one video-stream-play interactive control. Thus, matching of the view with the posture of the target device can be achieved. In addition, by adjusting the display position and/or transparency, the adaptability of the at least one video-stream-play interactive control to the adjusted video-stream-play view can be improved. In practice, different effects can be achieved according to different display styles. For example, a video-stream-play interactive control may be rendered invisible by adjusting the transparency of the video-stream-play interactive control, thereby achieving the clean display of the video-stream-play page.

BRIEF DESCRIPTION OF THE DRAWINGS

The above and other features, advantages and aspects of various embodiments of the present disclosure will become more apparent when taken in conjunction with the accompanying drawings and with reference to the following detailed description. Throughout the drawings, the same or similar reference numbers refer to the same or similar elements. It should be understood that the drawings are schematic and that the components and elements are not necessarily drawn to scale.

DETAILED DESCRIPTION

Embodiments of the present disclosure will be described in more detail below with reference to the accompanying drawings. While certain embodiments of the present disclosure are shown in the drawings, it should be understood that the present disclosure may be embodied in various forms and should not be construed as limited to the embodiments set forth herein. Rather, these embodiments are provided for a thorough and complete understanding of the present disclosure. It should be understood that the drawings and embodiments of the present disclosure are only for exemplary purposes, and are not intended to limit the protection scope of the present disclosure.

In addition, it should be noted that, for the convenience of description, only parts related to the related invention are shown in the drawings. In condition of no conflict, the embodiments of the present disclosure and features of the embodiments may be combined with each other.

It should be noted that concepts such as the "first," "second," or the like mentioned in the present disclosure are only used to distinguish different devices, modules or units, and are not used to limit the interdependence relationship or the order of functions performed by these devices, modules or units.

It should be noted that the modifications of "a," "an," "a plurality of," or the like mentioned in the present disclosure are illustrative rather than restrictive, and those skilled in the art should understand that unless the context clearly indicates otherwise, these modifications should be understood as "one or more."

The names of messages or information exchanged between multiple devices in the embodiments of the present disclosure are only for illustrative purposes, and are not intended to limit the scope of these messages or information.

The present disclosure will be described in detail below with reference to the accompanying drawings and in conjunction with the embodiments.

Figure 1:
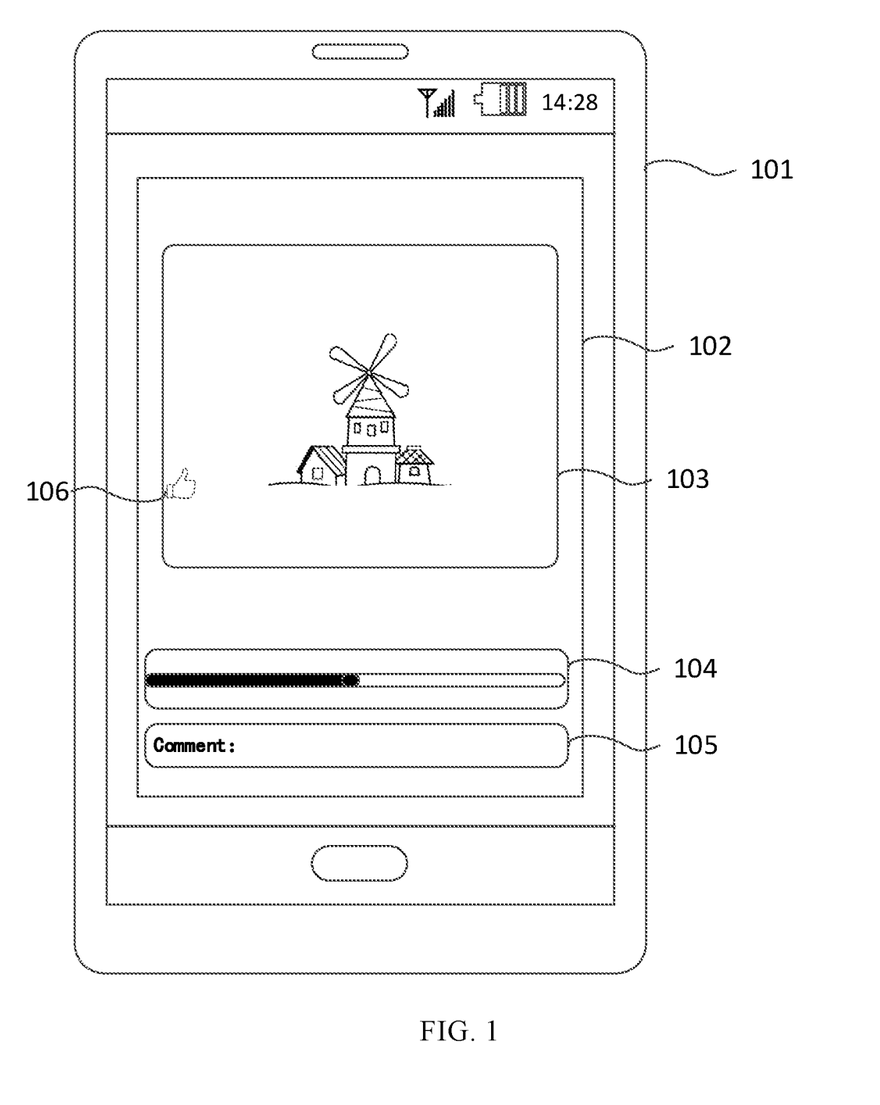
FIG. 1 and FIG. 2 are schematic diagrams of an application scenario of a method for adjusting a view for a target device according to some embodiments of the present disclosure.

FIG. 1 illustrates a schematic diagram of an application scenario where a method for adjusting a view for a target device according to some embodiments of the present disclosure can be applied.

The method for adjusting a view for a target device provided by some embodiments of the present disclosure is generally performed by a terminal device.

It should be noted that the terminal device may be either hardware or software. When implemented as hardware, the terminal device may be any electronic device having a display screen and supporting touch operations, including but not limited to a smart phone, a tablet computer, a laptop computer, etc. When implemented as software, the terminal device may be installed in the electronic devices listed above. Furthermore, the terminal device may be implemented as a plurality of pieces of software or software modules configured to, for example, provide distributed services, or implemented as a single piece of software or software module, which will not be particularly limited herein.

A user can use a terminal device to interact with a server via a network to receive or send messages, etc.

The server may be one that provides various services, for example, a background application server that provides support for applications installed on the terminal device.

It should be noted that the server may be either hardware or software. When the server is hardware, the server may be implemented as a distributed server cluster including a plurality of servers, or may be implemented as a single server. When being software, the server may be implemented as a plurality of pieces of software or software modules configured to, for example, provide distributed services, or may be implemented as a single piece of software or software module, which will not be specifically limited herein.

Figure 2:
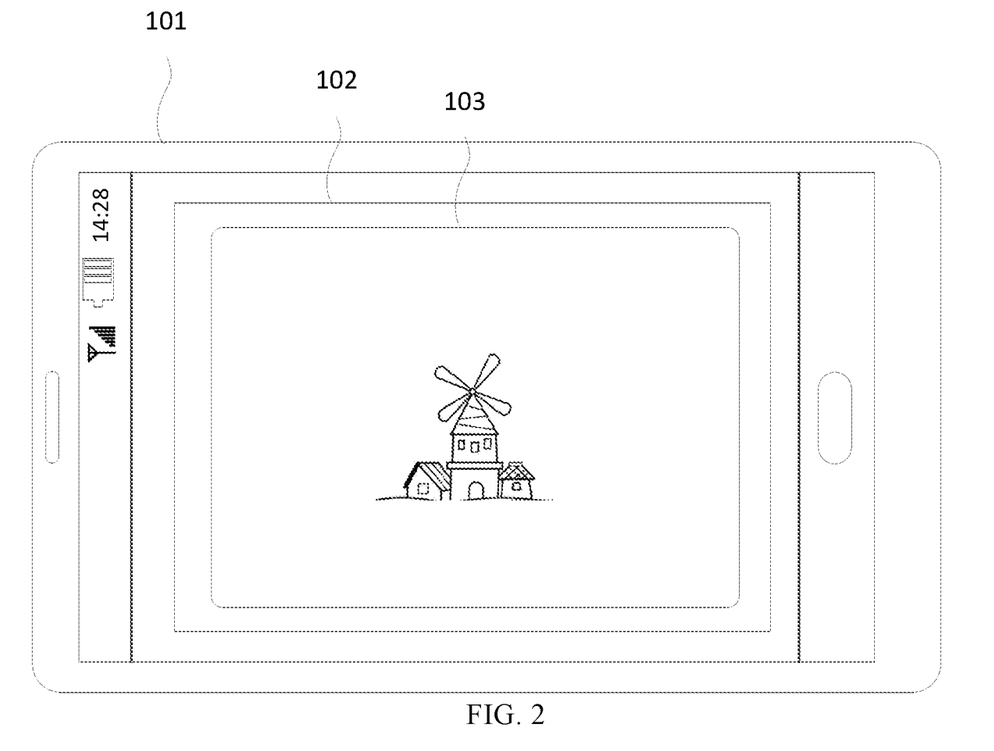

In the application scenario illustrated in FIG. 1, a performing entity for the method for adjusting a view for a target device may be a video-stream-play application installed on a smart phone 101. When the user uses the video-stream-play application to watch a video, the smart phone 101 displays a video-stream-play page 102. The video-stream-play page 102 includes a video-stream-play view 103 and three video-stream-play interactive controls displayed on the video-stream-play view 103. As illustrated in the figure, the three video-stream-play interactive controls are a progress bar 104, a comment region 105, and a thumb-up icon 106, respectively. On this basis, for example, when the user places the smart phone 101 leftwards horizontally, whether the currently playing video is a video of the first type may be determined in response to a detected posture change of the smart phone 101. As an example, whether the currently playing video is a horizontal-version video may be determined. Specifically, as an example, whether a length-width ratio of the currently playing video meets a preset condition may be determined. The video-stream-play application may adjust a display direction of the video-stream-play view 103 to match the leftwards horizontal posture of the target device, and as illustrated in FIG. 2, may hide the three video-stream-play interactive controls described above.

Figure 3:
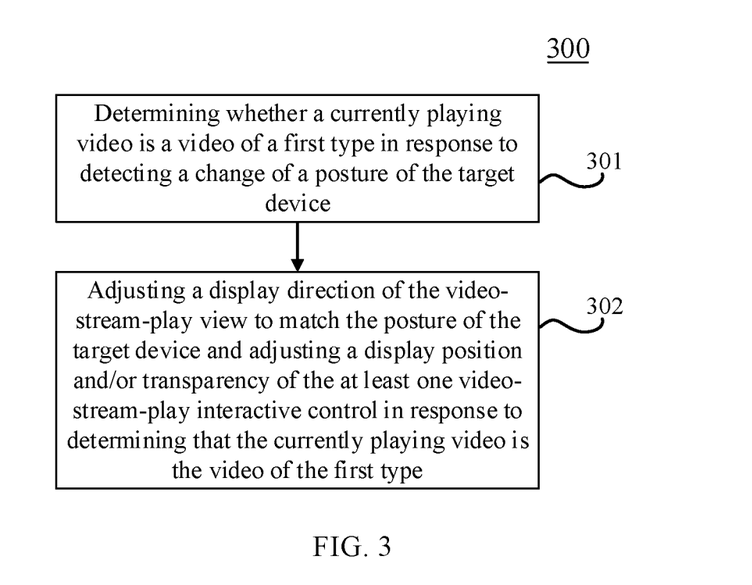
FIG. 3 is a flowchart of a method for adjusting a view for a target device according to some embodiments of the present disclosure.

FIG. 3 further shows a flowchart 300 of a method for adjusting a view for a target device according to some embodiments of the present disclosure. The method for adjusting a view for a target device includes the following steps:

Step 301: determining whether a currently playing video is a video of a first type in response to detecting a change of a posture of the target device.

In some embodiments, the target device may display a video-stream-play page. The video-stream-play page includes a video-stream-play view and at least one video-stream-play interactive control. The video-stream-play view may be used to play a video stream. The video-stream-play interactive control may be configured to represent any control supporting interaction with the user in the video-stream-play page, and may include but may not be limited to a progress bar, a sidebar, a navigation bar, a comment region, etc. Generally, the video-stream-play interactive control is displayed on the video-stream-play view. In practice, the video-stream-play view and the video-stream-play interactive control may be implemented by user interface (UI) development components. For example, the video-stream-play view or the video-stream-play interactive control may be implemented by View class.

In some embodiments, the target device may be any of a plurality of electronic devices (e.g., a smart phone). The target device may be specified, or may be chosen with certain conditions. The posture of the target device may be used to represent an orientation of the target device in three-dimensional space. As an example, the posture of the target device may be represented by the pitch, yaw, and roll. Generally, various sensors, such as a gravity sensor, an acceleration sensor, a temperature sensor, and an orientation sensor (O-sensor), may be provided in an electronic device which is represented by a smart phone. In practice, a performing entity for the method for adjusting a view for a target device may realize posture detection by means of various sensors. Specifically, parameters of various sensors may be acquired through an interface provided in an operating system or development software, so that posture detection can be realized by means of various sensors.

In some embodiments, whether the currently playing video is the video of the first type is determined in response to the detected posture change of the target device. As needed in practice, videos may be classified from different dimensions. For example, videos may be classified into vertical-version videos and horizontal-version videos by a length-width ratio of a video. For another example, videos may be classified into a plurality of types of videos according to different contents of the videos, etc. The first type may be pre-specified as needed in practice or may be determined according to certain conditions. A specific method for determining whether the video is one of the first type may vary with different video classification methods. As an example, whether the currently playing video is a horizontal-version video may be determined by determining whether the length-width ratio of the video meets a preset condition.

Step 302: adjusting a display direction of the video-stream-play view to match the posture of the target device and adjusting a display position and/or transparency of the at least one video-stream-play interactive control in response to determining that the currently playing video is the video of the first type.

In some embodiments, in response to determining that the currently playing video is the video of the first type, the above-mentioned performing entity may adjust the display direction of the video-stream-play view to match the posture of the target device and adjust the display position and/or transparency of the at least one video-stream-play interactive control. For example, in response to the detected posture change of the target device from the vertical screen to the horizontal screen, the display direction of the video-stream-play view may also be adjusted to horizontal display, thereby facilitating watching by the user and enhancing the operability of the device or the interactivity of the application. For another example, in response to the detected posture change of the target device from the leftwards horizontal screen to the rightwards horizontal screen, the display direction of the video-stream-play view may be rotated 180 degrees. On this basis, the above-mentioned performing entity may also adjust the display position and/or transparent of the at least one video-stream-play interactive control. As needed in practice, the display position and/or transparent of the interactive control may be adjusted to achieve different functions. As an example, a video-stream-play interactive control may be rendered invisible by adjusting the transparency of the video-stream-play interactive control, thereby achieving the clean display of the video-stream-play page. The display position of the at least one video-stream-play interactive control may be adjusted to facilitate the operation by the user.

In some alternative embodiments, in response to a detected first user operation for adjusting the display direction of the currently playing video, the display direction of the video-stream-play view is adjusted to match the posture of the target device, and the display position and/or transparency of the at least one video-stream-play interactive control is/are adjusted. In such embodiments, in a scenario where the user adjusts the display direction by an operation such as tapping on a virtual button for adjusting the display direction of the video, the display position and/or transparency of the video interactive control may be adjusted, so as to meet different scenario requirements.

In some alternative embodiments, the video-stream-play page further includes associated information of the currently playing video, and the above-mentioned method further includes: displaying the associated information in a form of a movable window on the video-stream-play view which is adjusted. In such embodiments, since the associated information is displayed on the video-stream-play view, part of video content may be obscured. As the associated information is provided in the form of the movable window, the window displaying the associated information may be moved as needed, so that the entire video content can be watched.

In such embodiments, by detecting the posture change of the target device and determining the type of the currently playing video, the display direction of the video-stream-play view is adjusted to match the posture of the target device, and the display position and/or transparency of the at least one video-stream-play interactive control is/are adjusted. Thus, matching of the view with the posture of the target device can be achieved. In addition, by adjusting the display position and/or transparency, the adaptability of the at least one video-stream-play interactive control to the adjusted video-stream-play view can be enhanced. In practice, different effects can be achieved according to different display styles. For example, a video-stream-play interactive control may be rendered invisible by adjusting the transparency of the video-stream-play interactive control, thereby achieving the clean display of the video-stream-play page.

Figure 4:
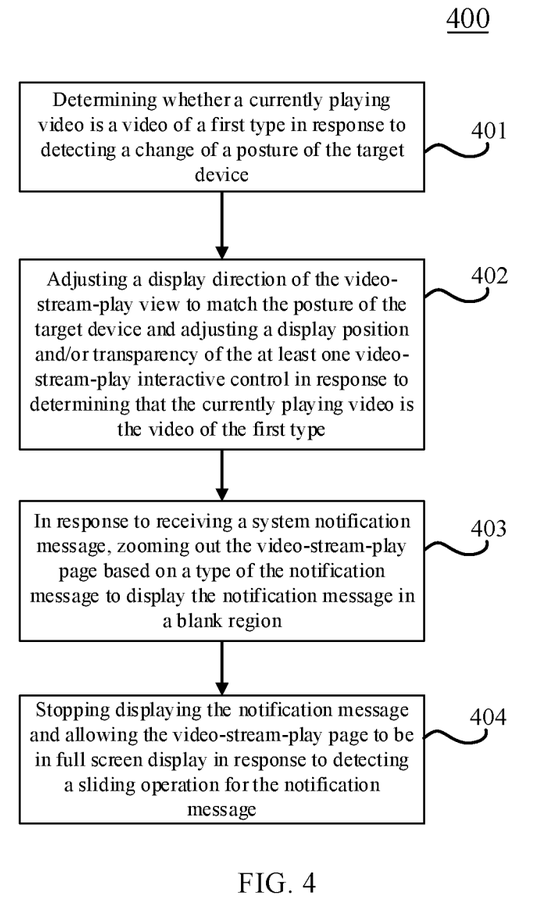
FIG. 4 is a flowchart of a method for adjusting a view for a target device according to another embodiments of the present disclosure.

Further referring to FIG. 4, FIG. 4 is a flowchart 400 of a method for adjusting a view for a target device according to another embodiments of the present disclosure. The method for adjusting a view for a target device includes the following steps:

Step 401: determining whether a currently playing video is a video of a first type in response to detecting a change of a posture of the target device.

Step 402: adjusting a display direction of the video-stream-play view to match the posture of the target device and adjusting a display position and/or transparency of the at least one video-stream-play interactive control in response to determining that the currently playing video is the video of the first type.

In some embodiments, specific implementations of steps 401 and 402 and the resulting technical effects may become obvious with reference to the embodiments corresponding to FIG. 3, which will not be described redundantly herein.

Step 403: in response to receiving a system notification message, zooming out the video-stream-play page based on a type of the notification message to display the notification message in a blank region.

In some embodiments, the user may receive a system notification message while watching a video. As an example, the system notification message includes but is not limited to short messages, messages pushed by other applications, system prompt messages, etc. Since regions of different sizes are needed to display different types of notification messages, the video-stream-play page is zoomed out according to the type of the notification message, so as to provide a blank region that displays the notification message therein and has a size matching the type of the notification message. In practice, the video-stream-play page may be zoomed out in different ways according to different types of notification messages. For example, if the notification message is a short message, the video-stream-play page may be zoomed out downwards so that the short message is displayed at the top of the screen. If the notification message is a message pushed by other applications (e.g., a message sent from a friend in an instant messaging application), the video-stream-play page may be zoomed out upwards to one third of the screen, thereby providing a region accounting for two thirds of the screen to display the message pushed by other applications and also facilitating operations such as timely replying to the pushed message (the method for adjusting a view for a target device).

Step 404: stopping displaying the notification message and allowing the video-stream-play page to be in full screen display in response to detecting a sliding operation for the notification message.

In some embodiments, the performing entity described above may detect various operations directed at the notification message and may stop displaying the notification message and enable full screen display of the video-stream-play page if a sliding operation is detected. Thus, when the user selects not to process the notification message or the processing of the notification message is finished, the full-screen mode may be switched by the sliding operation.

According to the method provided by some embodiments of the present disclosure, the video-stream-play page is zoomed out in response to the reception of the system notification message, thereby allowing the user to process other messages without exiting the video-stream-play page. In addition, after finishing the processing of other messages, the user may stop displaying the notification message and enable full screen display of the video-stream-play page by an operation such as sliding.

Figure 5:
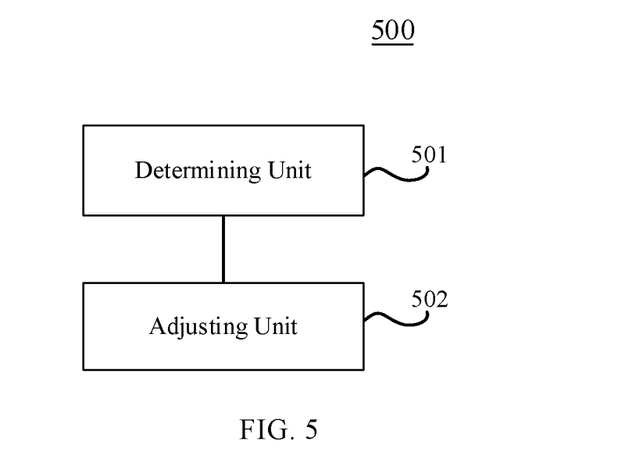
FIG. 5 is a schematic structural diagram of an apparatus for adjusting a view for a target device according to some embodiments of the present disclosure.

Further referring to FIG. 5, to implement the method described above with reference to the drawings, the present disclosure provides some embodiments of an apparatus for adjusting a view for a target device. The apparatus embodiments correspond to the method embodiments shown in FIG. 3. The apparatus may be specifically applied to various electronic devices.

As illustrated in FIG. 5, an apparatus 500 for adjusting a view for a target device in some embodiments is provided. The target device displays a video-stream-play page, the video-stream-play page includes a video-stream-play view and at least one video-stream-play interactive control displayed on the video-stream-play view, and the apparatus 500 includes a determining unit 501 and an adjusting unit 502. The determining unit 501 is configured to determine whether a currently playing video is a video of a first type in response to detecting a change of a posture of the target device. The adjusting unit 502 is configured to adjust a display direction of the video-stream-play view to match the posture of the target device and adjust a display position and/or transparency of the at least one video-stream-play interactive control in response to determining that the currently playing video is the video of the first type.

In some alternative embodiments, the video-stream-play page further includes associated information of the currently playing video. The apparatus 500 may further include a showing unit (not shown in the figure). The showing unit may be configured to display the associated information in a form of a movable window on the video-stream-play view which is adjusted.

In some alternative embodiments, the adjusting unit 501 is further configured to adjust the display direction of the video-stream-play view to match the posture of the target device and adjust the display position and/or transparency of the at least one video-stream-play interactive control in response to detecting a first user operation for adjusting a display direction of the currently playing video.

In some alternative embodiments, the apparatus 500 further includes a zooming-out unit (not shown in the figure) and a displaying unit (not shown in the figure). The zooming-out unit is configured to, in response to receiving a system notification message, zoom out the video-stream-play page based on a type of the notification message to display the notification message in a blank region. The displaying unit is configured to stop displaying the notification message and allowing the video-stream-play page to be in full screen display in response to detecting a sliding operation for the notification message.

In some embodiments, by detecting the posture change of the target device and determining the type of the currently playing video, the display direction of the video-stream-play view is adjusted to match the posture of the target device, and the display position and/or transparency of the at least one video-stream-play interactive control is/are adjusted. Thus, matching of the view with the posture of the target device can be achieved. In addition, by adjusting the display position and/or transparency, the adaptability of the at least one video-stream-play interactive control to the adjusted video-stream-play view can be enhanced. In practice, different effects can be achieved according to different display styles. For example, a video-stream-play interactive control may be rendered invisible by adjusting the transparency of the video-stream-play interactive control, thereby achieving the clean display of the video-stream-play page.

Figure 6:
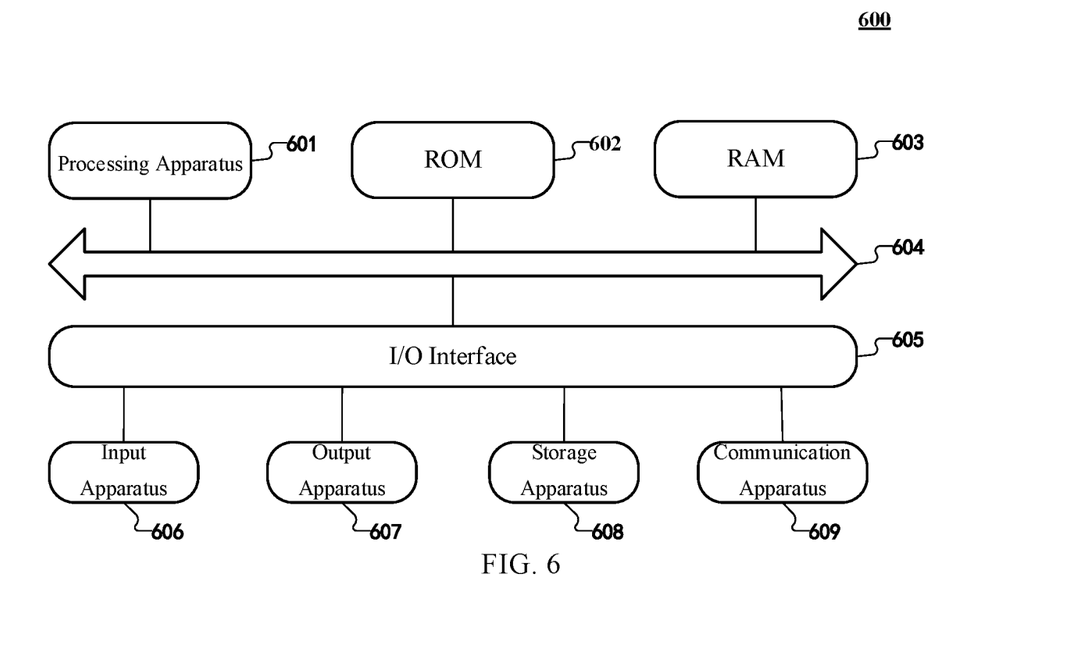
FIG. 6 is a schematic structural diagram of implementation of an electronic device according to some embodiments of the present disclosure.

Referring to FIG. 6, FIG. 6 illustrates a schematic structural diagram of an electronic device (e.g., the server or the terminal device in FIG. 1) 600 suitable for implementing some embodiments of the present disclosure. The terminal device in some embodiments of the present disclosure may include but not be limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), or the like, and fixed terminals such as a digital TV, a desktop computer, or the like. The terminal device shown in FIG. 6 is merely an example, and should not pose any limitation to the functions and the range of use of the embodiments of the present disclosure.

As illustrated in FIG. 6, the electronic device 600 may include a processing apparatus (e.g., a central processing unit, a graphics processing unit, etc.) 601, which can perform various suitable actions and processing according to a program stored in a read-only memory (ROM) 602 or a program loaded from a storage apparatus 608 into a random access memory (RAM) 603. The RAM 603 further stores various programs and data required for operations of the electronic device 600. The processing apparatus 601, the ROM 602, and the RAM 603 are interconnected by means of a bus 604. An input/output (I/O) interface 605 is also connected to the bus 604.

Usually, the following apparatus may be connected to the I/O interface 605: an input apparatus 606 including, for example, a touch screen, a touch pad, a keyboard, a mouse, a camera, a microphone, an accelerometer, a gyroscope, or the like; an output apparatus 607 including, for example, a liquid crystal display (LCD), a loudspeaker, a vibrator, or the like; a storage apparatus 608 including, for example, a storage card; and a communication apparatus 609. The communication apparatus 609 may allow the electronic device 600 to be in wireless or wired communication with other devices to exchange data. While FIG. 6 illustrates the electronic device 600 having various apparatuses, it should be understood that all the illustrated apparatuses are not necessarily implemented or included. More or less apparatuses may be implemented or included alternatively. Each block shown in FIG. 6 may represent an apparatus, or may represent a plurality of apparatuses as needed.

Particularly, according to some embodiments of the present disclosure, the processes described above with reference to the flowcharts may be implemented as a computer software program. For example, some embodiments of the present disclosure include a computer program product, which includes a computer program carried by a computer-readable medium. The computer program includes program codes for performing the methods shown in the flowcharts. In such embodiments, the computer program may be downloaded online through the communication apparatus 609 and installed, or may be installed from the storage apparatus 608, or may be installed from the ROM 602. When the computer program is executed by the processing apparatus 601, the functions defined in the method of some embodiments of the present disclosure are performed.

It should be noted that the computer-readable medium described in some embodiments of the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In some embodiments of the present disclosure, the computer-readable storage medium may be any tangible medium containing or storing a program that can be used by or in combination with an instruction execution system, apparatus or device. In some embodiments of the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-described computer-readable medium may be included in the above-described electronic device, or may also exist alone without being assembled into the electronic device. The above-described computer-readable medium carries one or more programs, and when the one or more programs are executed by the electronic device, the electronic device is cause to: determine whether a currently playing video is a video of a first type in response to detecting a change of a posture of the target device; and adjust a display direction of the video-stream-play view to match the posture of the target device and adjusting a display position and/or transparency of the at least one video-stream-play interactive control in response to determining that the currently playing video is the video of the first type.

The computer program codes for executing the operations according to some embodiments of the present disclosure may be written in one or more programming languages or a combination thereof; the above-described programming languages include object-oriented programming languages such as Java, Smalltalk, C++, and also include conventional procedural programming languages such as "C" language or similar programming languages. The program code may by executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flow chart and block diagrams in the accompanying drawings illustrate the architecture, functionality, and operation of possible implementations of systems, methods, and computer program products according to various embodiments of the present disclosure. In this regard, each block in the flow chart or block diagrams may represent a module, a program segment, or a portion of codes, which comprises one or more executable instructions for implementing specified logical function. It should also be noted that, in some alternative implementations, the functions noted in the block may occur out of the order noted in the accompanying drawings. For example, two blocks shown in succession may, in fact, can be executed substantially concurrently, or the blocks may sometimes be executed in a reverse order, depending upon the functionality involved. It should also be noted that, each block of the block diagrams and/or flow charts, and combinations of blocks in the block diagrams and/or flow charts, may be implemented by special purpose hardware-based systems that execute the specified functions or operations, or may also be implemented by a combination of special purpose hardware and computer instructions.

The units as described in some embodiments of the present disclosure may be implemented by means of software, or may also be implemented by means of hardware. The described unit may also be provided in a processor, which, for example, may be described as: a processor, including an adjusting unit. Names of these units do not constitute a limitation on the units themselves in some cases, for example, the adjusting unit may also be described as "a unit for adjusting a video-stream-play view and a video-stream-play interactive control."

The functions described herein above may be executed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

According to one or more embodiments of the present disclosure, a method for adjusting a view for a target device is provided, the target device displays a video-stream-play page, the video-stream-play page comprises a video-stream-play view and at least one video-stream-play interactive control displayed on the video-stream-play view, and the method comprises: determining whether a currently playing video is a video of a first type in response to detecting a change of a posture of the target device; and adjusting a display direction of the video-stream-play view to match the posture of the target device and adjusting a display position and/or transparency of the at least one video-stream-play interactive control in response to determining that the currently playing video is the video of the first type.

According to one or more embodiments of the present disclosure, the video-stream-play page further comprises associated information of the currently playing video; and the method further comprises: displaying the associated information in a form of a movable window on the video-stream-play view which is adjusted.

According to one or more embodiments of the present disclosure, the method further comprises: adjusting the display direction of the video-stream-play view to match the posture of the target device and adjusting the display position and/or transparency of the at least one video-stream-play interactive control in response to detecting a first user operation for adjusting a display direction of the currently playing video.

According to one or more embodiments of the present disclosure, the method further comprises: in response to receiving a system notification message, zooming out the video-stream-play page based on a type of the notification message to display the notification message in a blank region; and stopping displaying the notification message and allowing the video-stream-play page to be in full screen display in response to detecting a sliding operation for the notification message.

According to one or more embodiments of the present disclosure, an apparatus for adjusting a view for a target device is provided, the target device displays a video-stream-play page, the video-stream-play page comprises a video-stream-play view and at least one video-stream-play interactive control displayed on the video-stream-play view, and the apparatus comprises: a determining unit, configured to determine whether a currently playing video is a video of a first type in response to detecting a change of a posture of the target device; and an adjusting unit, configured to adjust a display direction of the video-stream-play view to match the posture of the target device and adjust a display position and/or transparency of the at least one video-stream-play interactive control in response to determining that the currently playing video is the video of the first type.

According to one or more embodiments of the present disclosure, the video-stream-play page further comprises associated information of the currently playing video; and the apparatus further comprises: a showing unit, configured to display the associated information in a form of a movable window on the video-stream-play view which is adjusted.

According to one or more embodiments of the present disclosure, the adjusting unit is further configured to: adjust the display direction of the video-stream-play view to match the posture of the target device and adjust the display position and/or transparency of the at least one video-stream-play interactive control in response to detecting a first user operation for adjusting a display direction of the currently playing video.

According to one or more embodiments of the present disclosure, the apparatus further comprises: a zooming-out unit, configured to, in response to receiving a system notification message, zoom out the video-stream-play page based on a type of the notification message to display the notification message in a blank region; and a displaying unit, configured to stop displaying the notification message and allowing the video-stream-play page to be in full screen display in response to detecting a sliding operation for the notification message.

According to one or more embodiments of the present disclosure, an electronic device is provided, and the electronic device includes one or more processors, and a memory, on which one or more programs are stored; and the one or more programs, when executed by the one or more processors, cause the one or more processors to implement any of the methods described above.

According to one or more embodiments of the present disclosure, a computer-readable medium is provided, on which a computer program is stored, and the program, when executed by a processor, implements any of the methods described above.

The above descriptions are merely some preferred embodiments of the present disclosure and illustrations of the applied technical principles. Those skilled in the art should understand that the scope of the invention involved in the embodiments of the present disclosure is not limited to the technical solution formed by the specific combination of the above-mentioned technical features, and should also cover, without departing from the above-mentioned inventive concept, other technical solutions formed by any combination of the above-mentioned technical features or their equivalent features, for example, the technical solution formed by replacing the above features with the technical features with similar functions disclosed in the embodiments of the present disclosure (but not limited to).

The invention claimed is:

1. A method for adjusting a view for a target device, wherein the target device displays a video-stream-play page, the video-stream-play page comprises a video-stream-play view and at least one video-stream-play interactive control displayed on the video-stream-play view, and the method comprises:
   determining whether a currently playing video is a video of a first type in response to detecting a change of a posture of the target device;
   adjusting a display direction of the video-stream-play view to match the posture of the target device and adjusting at least one of a display position or transparency of the at least one video-stream-play interactive control in response to determining that the currently playing video is the video of the first type;
   in response to receiving a system notification message, zooming out the video-stream-play page based on a type of the notification message to display the notification message in a blank region; and
   stopping displaying the notification message and allowing the video-stream-play page to be in full screen display in response to detecting a sliding operation for the notification message.

2. The method according to claim 1, wherein the video-stream-play page further comprises associated information of the currently playing video; and the method further comprises:

displaying the associated information in a form of a movable window on the video-stream-play view which is adjusted.

3. The method according to claim 1, further comprising:
adjusting the display direction of the video-stream-play view to match the posture of the target device and adjusting the at least one of the display position or transparency of the at least one video-stream-play interactive control in response to detecting a first user operation for adjusting a display direction of the currently playing video.

4. An apparatus for adjusting a view for a target device, wherein the target device displays a video-stream-play page, the video-stream-play page comprises a video-stream-play view and at least one video-stream-play interactive control displayed on the video-stream-play view, and the apparatus comprises:
at least one processor; and
at least one memory communicatively coupled to the at least one processor and storing instructions that upon execution by the at least one processor cause the apparatus to:
determine whether a currently playing video is a video of a first type in response to detecting a change of a posture of the target device;
adjust a display direction of the video-stream-play view to match the posture of the target device and adjust at least one of a display position or transparency of the at least one video-stream-play interactive control in response to determining that the currently playing video is the video of the first type;
in response to receiving a system notification message, zoom out the video-stream-play page based on a type of the notification message to display the notification message in a blank region; and
stop displaying the notification message and allowing the video-stream-play page to be in full screen display in response to detecting a sliding operation for the notification message.

5. The apparatus according to claim 4, wherein the video-stream-play page further comprises associated information of the currently playing video; and the at least one memory further stores instructions that upon execution by the at least one processor cause the apparatus to:
display the associated information in a form of a movable window on the video-stream-play view which is adjusted.

6. The apparatus according to claim 4, wherein the at least one memory further stores instructions that upon execution by the at least one processor cause the apparatus to:
adjust the display direction of the video-stream-play view to match the posture of the target device and adjust the at least one of the display position or transparency of the at least one video-stream-play interactive control in response to detecting a first user operation for adjusting a display direction of the currently playing video.

7. A non-transitory computer-readable storage medium, on which a computer program is stored, wherein the program, when executed by a processor, implements operations comprising:
determining whether a currently playing video is a video of a first type in response to detecting a change of a posture of a target device, wherein the target device displays a video-stream-play page, and the video-stream-play page comprises a video-stream-play view and at least one video-stream-play interactive control displayed on the video-stream-play view;
adjusting a display direction of the video-stream-play view to match the posture of the target device and adjusting at least one of a display position or transparency of the at least one video-stream-play interactive control in response to determining that the currently playing video is the video of the first type;
in response to receiving a system notification message, zooming out the video-stream-play page based on a type of the notification message to display the notification message in a blank region; and
stopping displaying the notification message and allowing the video-stream-play page to be in full screen display in response to detecting a sliding operation for the notification message.

8. The non-transitory computer-readable storage medium of claim 7, wherein the video-stream-play page further comprises associated information of the currently playing video; and the operations further comprise:
displaying the associated information in a form of a movable window on the video-stream-play view which is adjusted.

9. The non-transitory computer-readable storage medium of claim 7, the operations further comprising:
adjusting the display direction of the video-stream-play view to match the posture of the target device and adjusting the at least one of the display position or transparency of the at least one video-stream-play interactive control in response to detecting a first user operation for adjusting a display direction of the currently playing video.

* * * * *